Dec. 1, 1970  J. E. MEYN  3,543,337
APPARATUS FOR MANUFACTURING INSULATORS FOR
MULTIPLE CONDUCTOR CONNECTORS
Original Filed April 8, 1966
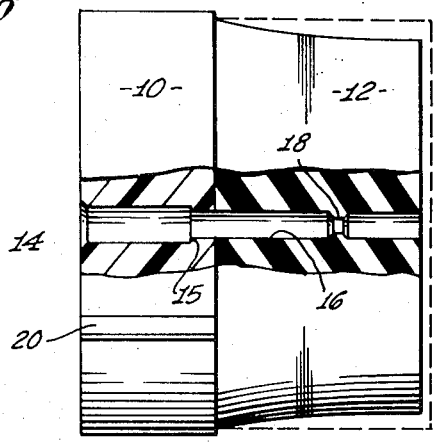
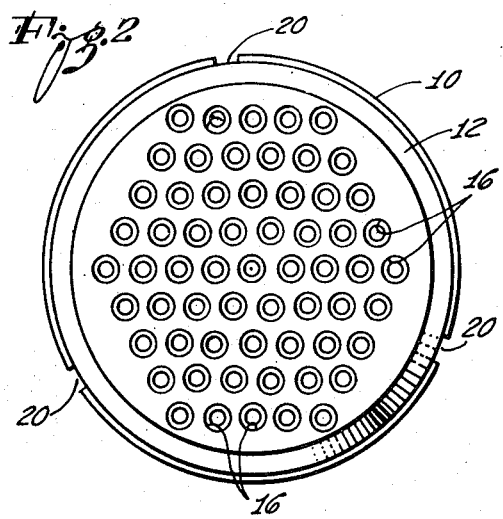
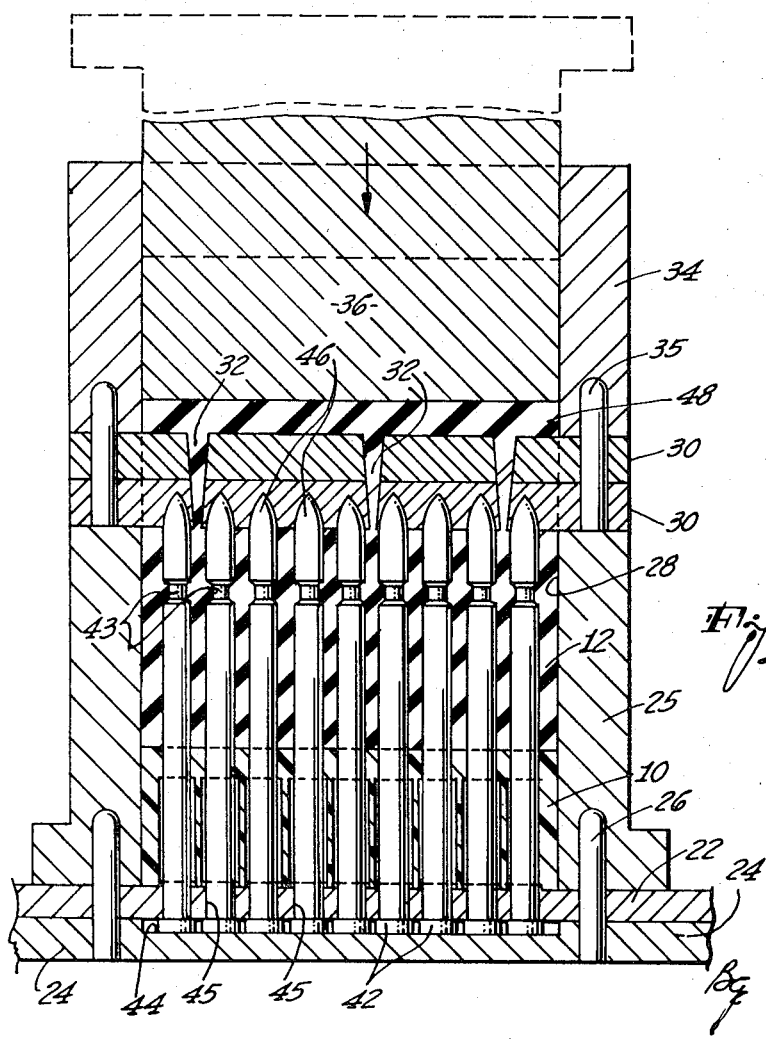
INVENTOR
JOHN E. MEYN
ATTORNEYS United States Patent Office 3,543,337
Patented Dec. 1, 1970

3,543,337
APPARATUS FOR MANUFACTURING IN-
SULATORS FOR MULTIPLE CONDUCTOR
CONNECTORS
John E. Meyn, Anaheim, Calif., assignor to Microdot
Inc., South Pasadena, Calif., a corporation of California
Original application Apr. 8, 1966, Ser. No. 541,162.
Divided and this application Aug. 14, 1968, Ser.
No. 765,737
Int. Cl. B29d 3/00
U.S. Cl. 18—36                                                5 Claims

ABSTRACT OF THE DISCLOSURE

The product is a multiple-bore rigid insulator of thermo-setting material with a multiple-bore elastomeric grommet united therewith. The rigid insulator is placed in a mold with multiple core pins extending from the multiple bores thereof through a mold cavity. The face of the rigid insulator is coated with uncured thermosetting adhesive and then, with the mold heated, uncured elastomeric material is extruded under heat and pressure into the mold cavity to form the grommet around the core pins and to bond the resultant grommet to the face of the insulator. When the product is ejected from the mold and from the core pins, the grommet assumes a desirable tapered configuration.

This is a division of application Ser. No. 541,162 filed Apr. 8, 1966.

This invention relates to the fabrication of an object comprising two plastic bodies bonded together with the strength of the bond greater than the strength of the materials of the two bodies. The initial practice of the invention is directed specifically to the problem of providing a multiple bore insulator with an extension in the form of an elastomeric grommet bonded integrally thereto.

Such an assembly of two united bodies enclosed by a suitable metal sleeve structure is commonly employed in a multiple-conductor electrical connector with ether pin elements or complementary socket elements mounted in the multiple bores. It is desirable that the insulator which forms the base portion of such an assembly be relatively rigid and strong but that the grommet which forms the forward portion be made of yieldable elastomeric material. For this reason, it is desirable to mold two bodies of two different materials, the insulator being made of rigid material such as epoxy resin and the grommet being made of a suitable elastomer such as silicone rubber.

One problem to be met in the fabrication of such a composite structure is to provide a joint or bond between the two different bodies that it at least as strong as the material of the two bodies. Another problem is to eliminate any possibility of voids at the interface of the two bodies. Since the materials selected for the insulator and the grommet respectively are of dielectric strength that greatly exceeds the dielectric strength of air, any air-filled space at the interface is a serious defect that may result in voltage flash-over between the closely spaced conductors.

A third problem is to bond together a multiple-bore insulator and a complementary multiple-bore grommet with accurate alignment of the two sets of bores. Since multiple-conductor connectors are commonly of compact design with closely spaced conductors, permissible tolerances are necessarily restricted. For example, such a composite body of an overall diameter of .750″ may be provided with sixty-one bores, the diameter of the matching bores at the interface being .054–.056″, with the bores arranged in staggered rows with center-to-center spacing in each row of .080–.082″, the perimeter-to-perimeter spacing of the bores in a row being .024–.028.″

It is difficult to preform the two bodies and then match the two sets of sixty-one bores with acceptable precision and especially so for quantity production at economical fabrication cost.

The solution to these problems is found in certain concepts which work together for the purpose of the invention. One concept is that the task of bonding the insulator and grommet together may be simplified by first molding the insulator and then using the insulator as part of a mold for forming the grommet, the grommet being in effect molded against the insulator. A second concept is to employ a suitable adhesive at the interface of the two bodies as a primer coat, the primer coat being compatible with the materials of both bodies to make possible a bond of especially high strength. A third concept is that elimination of voids at the interface may be promoted by employing two successive primary coats, the first coat being cured in advance to fill in minute surface depressions and to provide a smooth surface for the application of the second coat.

Another concept is to take advantage of the fact that injection molding of the grommet against the insulator inherently results in elevated temperature and high pressure at the interface so that any prime coat that is present at the interface is subjected to such heat and pressure. Under heat and pressure a suitable primary coat that is compatible with the materials of both of the two bodies creates fusion at the interface to make the joint between the two bodies stronger than the materials of the two bodies. Still another concept is that injection molding of the grommet against the insulator is possible if the insulator is made of a thermosetting resin that is capable of withstanding the heat and pressure, for example epoxy reinforced by embedded glass fibers.

A further concept is that in the operation of molding the grommet extension, the insulator may serve in effect as a jig to hold multiple cores for molding the multiple bores in the grommet. Thus core pins may extend through the insulator into the grommet to form the multiple bores in the grommet. A still further concept is to mount the core pins in the mold in a floating manner with an appreciable degree of freedom for lateral movement of the individual core pins, to make the core pins capable of self alignment with the bores in the insulator.

An unexpected advantage of the invention relates to the difficulty that is usually encountered in telescoping a snug fitting sleeve or ferrule over the grommet. If the grommet is made of a material such as silicone rubber that shrinks as it cures in the mold, the fact that one end of the grommet is anchored face-to-face to the rigid insulator results in the grommet tapering towards its outer end. This taper greatly facilitates telescoping a sleeve or ferrule over the grommet.

Another advantage of the invention is that the core pins may be circumferentially recessed or grooved to result in the formation of restrictions in the bores of the grommet. Since the grommet is made of elastomeric material the resilient restrictions function in the same manner as small O-rings to form seals around the conductors or contact elements that are inserted into the bores.

The various features and advantages of the invention may be understood from the following detailed description and the accompanying drawing.

In the drawing, which is to be regarded as merely illustrative:

FIG. 1 is a side elevation of the presently preferred embodiment of the invention, the view being partly in section;

FIG. 2 is an end elevation of the embodiment shown in FIG. 1; and

FIG. 3 is a simplified sectional view of apparatus that may be employed for the molding operation.

The selected embodiment shown in the drawings is a composite body for use in a multiple-conductor electrical connector, the composite body comprising an insulator 10 with a grommet 12 bonded thereto to function as an extension thereof. The insulator 10 is a rigid body of substantial strength and is preferably made of a suitable thermosetting resin which in this particular example is epoxy reinforced by embedded glass fibers. Other materials that may be employed include diallyl phthalate, melamine, phenol formaldehyde resin and alkyd molding compounds. The grommet 12 is made of silicone rubber but other commonly known elastomers may be used such as butyl, nitrile, neoprene, SBR, EPR, or natural rubber.

The composite body has a plurality of bores extending longitudinally through both the insulator 10 and the grommet 12. As shown in section in FIG. 1 each bore 14 of the insulator 10 is of stepped configuration forming an inner circumferential shoulder 15 and each of the matching bores 16 of the grommet is of the stepped down diameter. Preferably each of the bores 16 of the grommet is formed with a circumferential restriction 18 which by virtue of the resilient yieldability of the material of the grommet functions in the manner of an O-ring. Thus in an electrical connector a contact element having a ferrule or enlargement at its base end may be mounted in the composite body with the ferrule or enlargement in abutment with the shoulder 15 and with the contact element, for example a pin element, extending through the grommet and embraced in a sealing manner by a restriction 18.

The outer circumferential surface of the insulator 10 may be formed with three longitudinal grooves 20 by means of which it may be keyed to a surrounding metal casing. It is to be noted that the grommet 12 is of tapered configuration to facilitate the insertion of the grommet into an encircling casing.

To carry out the contemplated method of fabricating the composite body shown in FIGS. 1 and 2, the insulator 10 is molded in advance in any suitable manner and then the forward face of the insulator is coated with a suitable primer in the form of an adhesive that is compatible with both the epoxy material of the insulator and the silicone rubber of the grommet. In this particular practice of the invention, a mixture of the following ingredients and parts by weight is employed:

| | Parts |
|---|---|
| Dially phthalate | 90 |
| Diallyl phthalate monomer | 10 |
| Tertiary butyl perbenzoate | 5 |

These ingredients are mixed with a solvent which may comprise:

| | |
|---|---|
| Toluol | 150 |
| Methyl ethyl ketone | 50 |

When the thermosetting resin mixture is stirred into the solvent with a high speed mixer the resultant is an adhesive solution containing approximately 33⅓ percent solids.

In the preferred practice of the invention two coats of the primer are applied to the forward face of the insulator and the first coat is cured on the insulator by baking in an oven for fifteen minutes at 300° F. The cured first coat fills all of the minute depressions in the face of the insulator and serves as an anchor coat with a smooth surface to receive the second coat. The second coat is applied to the anchor coat and is not cured prior to the molding operation. If desired, only one coat may be employed, the coat being left uncured prior to the molding operation.

For the purpose of the present invention it is within the skill expected in the art to select other adhesives to be used as primers to bond together other bodies made of materials. For example, if the insulator 10 is made of melamine and the grommet 12 is to be made of butyl rubber, the primer may be an epoxy adhesive with a curing agent such as primary aromatic amine.

To carry out the further steps of the preferred fabrication procedure, a suitable molding apparatus is employed, for example, a molding structure of the character shown more or less diagrammatically in FIG. 3.

The structure shown in FIG. 3 includes two lower base plates 22 and 24 positioned face to face with a cylinder 25 removably resting on the upper base plate 22 and with the three parts keyed together by dowel pins 26 extending upward from the lower base plate 24. The cylinder 25 is dimensioned for smooth fit by the preformed insulator 10 and is of an axial dimension sufficient for the cylinder to cooperate with the insulator to form a mold cavity 28 of the size and configuration of the desired grommet 12. The mold cavity 28 is covered by a pair of separable shut-off plates 30 having a plurality of sprue passages 32. A second cylinder 34 rests on the cutoff plates 30 to form a pot to receive the material that is to form the grommet. Both the shutoff plates and the pot are removable and both are releasably retained concentric to the lower cylinder 25 by means of a plurality of dowel pins 35 that extend upward from the lower cylinder 25. The molding apparatus is completed by a suitable ram 35 that is dimensioned for a snug sliding fit in the pot or upper cylinder 34.

For the purpose of forming the required multiple bores in the molded grommet 12, a plurality of suitable core pins 40 extend upward through the mold cavity 28. In the construction shown in FIG. 3, the lower ends of the core pins 40 are formed with heads or enlargements 42. In the preferred practice of the invention each core pin is further formed with a circumferential groove or recess 43.

The lower base plate 24 is cut away on its upper surface as indicated at 44 to clear the heads 42 of the core pins and the upper base plate 22 is formed with bores 45 for the core pins that are smaller than the heads 42 of the core pins but slightly larger than the shanks of the core pins. A feature of the invention is the concept of making the bores 45 of the upper base plate 22 sufficiently larger than the shanks of the core pins 40 to make the core pins "floating," i.e. to give the core pins a slight degree of freedom for lateral movement thereby to permit the core pins to align themselves freely with the corresponding multiple bores of an insulator 10 when the insulator is placed in the mold structure.

In the construction shown, the upper ends of the core pins 40 are pointed and seat snugly in corresponding tapered recesses 46 in a shutoff plate 30. Thus the tapered recesses 46 in the shutoff plate cooperate with an insulator 10 and the base plate 22 to maintain alignment of the core pins.

In preparation for the molding operation, the mold structure shown in FIG. 3 is preheated, for example to a temperature of 320° F. For this purpose the mold structure may be placed on the hot platens of a hydraulic press which is used for the molding operation.

When the mold structure is heated to the required temperature it is moved from the press and is taken apart to make the interior of the lower cylinder 25 accessible. A pre-molded insulator 10 with its forward face primed with the selected adhesive material is then lowered into the lower cylinder 25 to cause the multiple bores of the insulator to telescope over the corresponding core pins 40. The shutoff plates 30 are then mounted on the lower cylinder 25 and then the upper cylinder 34 is mounted on the shutoff plates. A charge 48 of silicone rubber is then placed in the pot that is formed by the upper cylinder 24 and the ram 36 is moved downward to force the charge through the sprue passages 32 into the mold cavity 28. The volume of the charge of silicone rubber is somewhat greater than the volume of the mold cavity 28 after the mold chamber is completely filled.

Initial downward movement of the ram 36 to extrude the silicone rubber into the mold cavity 28 is carried out at a pressure of approximately 700 p.s.i. and after the mold cavity is completely filled the pressure applied by the ram 36 is increased to 1,000 p.s.i. and is held at that level for fifteen seconds. Pressures will vary with different size parts. At the end of the fifteen seconds the pressure applied by the ram 36 is allowed to drift for a cure period of approximately five minutes and then the molded product is removed from the mold structure and from the core pins 40. As soon as the composite body is removed from the mold structure it is placed in an oven at 350° F. for an eight hour final cure period. The final product may then be cleaned and inspected.

The heat and pressure involved in the described procedure of injection molding the grommet against the forward face of the insulator causes fusion of the materials at the interface between the insulator and the grommet to result in the desired high strength bond.

The silicone rubber that forms the grommet 12 shrinks as it cures but the shrinkage is opposed by the face-to-face bonding of the grommet to the insulator. As a result, the grommet assumes the highly desirable tapered configuration that cannot be duplicated by any other molding technique. It is to be noted that although the grommet is tapered longitudinally the bores in the grommet are of uniform diameter because of the presence of the core pins during the cure period.

My description in specific detail of the presently preferred practice of the invention will suggest various changes, substitutions and other departures from my disclosure within the spirit and scope of the appended claims.

I claim:

1. In an apparatus to mold material constituting a grommet extension on the inner end face of a multiple bore electrical insulator, the combination of:
    a plurality of core pins extending through the bores in the insulator;
    mold means to enclose the insulator and to form therewith a cavity bounded on one side by the insulator;
    a shut-off plate with a plurality of sprue passages therethrough, the sprue passages being disposed in displaced relationship to the pins in a direction transverse to the direction of the pins;
    means cooperative with the shut-off plate to form a chamber to be charged with the molding material for forming the grommet; and
    means to act on the material in the chamber and the mold means to displace the material into the cavity through the sprue passages and to act through the through the sprue passages and to act through the sprue passages to maintain the material in the cavity under high pressure for bonding the grommet to the insulator.

2. A combination as set forth in claim 1 in which the shut-off plate is constructed with means to receive the core pins with freedom for movement of the core pins relative to the shut-off plate in the transverse direction to provide for the alignment of the core pins with the bores in the insulator.

3. A combination as set forth in claim 2 in which said means to receive the core pins in the shut-off plate is provided with recesses to receive the core pins and in which means are included for heating the mold means and the shut-off plate prior to the displacement of the mold material through the sprue passages into the cavity.

4. In apparatus to mold material constituting a grommet extension on an end face of a rigid insulator of plastic material, a plurality of pins extending through bores in the insulator,
    mold means to enclose the insulator and to form with the insulator a cavity defined at one end by the insulator;
    means for closing the cavity in the mold means, the closing means having a plurality of sprue passages displaced from the pins in the insulator to provide for the flow of the mold material through the sprue passages into the cavity and around the pins;
    means cooperative with the closing means to form a chamber to be charged with the mold material for forming the grommet; and
    means to act on the mold material in the chamber and the closing means to displace the mold material into the cavity and to act through the sprue passages to maintain the material in the cavity under high pressure and to mold the material to the insulator.

5. In the apparatus set forth in claim 4,
    the pins extending through the bores of the insulator across the cavity to the closing means and the mold means being constructed to provide for a freedom of movement of the core pins in a direction transverse to the direction of the pins to provide for an alignment of the core pins with the bores in the insulator when the mold material flows into the cavity.

References Cited

UNITED STATES PATENTS

| | | | |
|---|---|---|---|
| 2,357,950 | 9/1944 | Goessling | 18—42 X |
| 2,416,680 | 3/1947 | Curtis | 18—42 X |
| 2,483,093 | 9/1949 | Harvey | 249—68 |
| 3,077,003 | 2/1963 | Hobson | 18—42 X |
| 3,145,422 | 8/1964 | Danbenberger et al. | 18—45 X |
| 3,196,485 | 7/1965 | Battenfeld et al. | 18—42 X |
| 3,202,749 | 8/1965 | White | 18—42 X |
| 3,293,694 | 12/1966 | Taylor | 18—36 |
| 3,405,214 | 10/1968 | Britts | 18—36 X |

J. HOWARD FLINT, JR., Primary Examiner

U.S. Cl. X.R.

18—42, 45; 249—83